US009073191B2

(12) United States Patent
Zaccaria

(10) Patent No.: US 9,073,191 B2
(45) Date of Patent: Jul. 7, 2015

(54) PIPE SEPARATING METHOD

(76) Inventor: David L. Zaccaria, Price, UT (US)

( * ) Notice: Subject to any disclaimer, the term of this patent is extended or adjusted under 35 U.S.C. 154(b) by 860 days.

(21) Appl. No.: 13/220,345

(22) Filed: Aug. 29, 2011

(65) Prior Publication Data

US 2013/0047398 A1 Feb. 28, 2013

(51) Int. Cl.
*B23P 11/00* (2006.01)
*B25B 27/10* (2006.01)
*B25B 27/02* (2006.01)

(52) U.S. Cl.
CPC ........... *B25B 27/10* (2013.01); *Y10T 29/53991* (2015.01); *Y10T 29/49815* (2015.01); *B25B 27/02* (2013.01); *Y10T 29/49822* (2015.01); *Y10T 29/53896* (2015.01); *Y10T 29/53843* (2015.01)

(58) Field of Classification Search
CPC B25B 27/02; B25B 13/5008; B25B 13/5016; Y10T 29/49822; Y10T 29/53843; Y10T 29/53896
USPC ................................. 29/426.5, 267, 275, 278
See application file for complete search history.

(56) References Cited

U.S. PATENT DOCUMENTS

| | | | | | |
|---|---|---|---|---|---|
| 3,562,891 | A | * | 2/1971 | Earl | 29/221.5 |
| 3,585,704 | A | * | 6/1971 | Schroeder | 29/235 |
| 4,571,808 | A | * | 2/1986 | King | 29/268 |
| 4,598,452 | A | * | 7/1986 | Iseki | 29/237 |
| 5,495,651 | A | * | 3/1996 | Tsuha | 29/235 |
| 5,537,727 | A | * | 7/1996 | Mayer | 29/237 |
| 6,886,229 | B1 | * | 5/2005 | Wilson | 29/267 |
| 7,618,031 | B2 | * | 11/2009 | Weaver et al. | 269/25 |
| 7,628,212 | B2 | * | 12/2009 | Tjader | 166/380 |
| 8,341,816 | B1 | * | 1/2013 | Swinford | 29/237 |
| 2006/0218765 | A1 | * | 10/2006 | Chang | 29/237 |
| 2009/0199410 | A1 | * | 8/2009 | Legostaev, Jr. | 30/167 |
| 2009/0199962 | A1 | * | 8/2009 | Legostaev, Jr. | 156/247 |
| 2010/0192345 | A1 | * | 8/2010 | Monyak et al. | 29/278 |
| 2011/0126391 | A1 | * | 6/2011 | Biktjorn et al. | 29/283 |

OTHER PUBLICATIONS

Photographs of tool, which was made in Utah, U.S.A. by others at the request of the inventor, and was used, in accordance with methods claimed in the U.S. Appl. No. 13/220,345, by the inventor, on sprinkler pipes on the inventor's private residence in Utah, U.S.A, on information and belief, at least as early as Jul. 2010 (3 pages).

* cited by examiner

*Primary Examiner* — Jermie Cozart

(74) *Attorney, Agent, or Firm* — Workman Nydegger

(57) ABSTRACT

A pipe separator for separating pipes at a pipe joint includes an elongate shaft and an engagement portion. The engagement portion is configured to be mounted adjacent to a pipe joint. A force is applied to the pipe separator to separate the pipes at the joint without damaging the pipes.

9 Claims, 7 Drawing Sheets

PIPE SEPARATING METHOD

BACKGROUND OF THE INVENTION

1. The Field of the Invention

This invention is in the field of tools used for assembly of pipes and pipe systems, such as complex sprinkler pipe systems. Specifically, the present invention relates to a device for separating a pipe assembly.

2. The Relevant Technology

When assembling a system of pipes, such as PVC sprinkler pipes, it is often desirable to temporarily couple two lengths of pipe together, and then check the positioning of the pipes to ensure the pipes fit properly before they are permanently affixed. However, once the pipes are temporary coupled, they tend to become stuck together, even in the absence of an affixing agent (e.g., pipe glue).

This problem can be partially attributable to the low tolerance between the outer diameter of the male end of the first pipe and the inner diameter of the female end of the second pipe. Additionally, when disengaging pipes from an assembly, the tangential force exerted must be sufficient to overcome the static coefficient of friction. When pipes are initially coupled together, the tangential force required to keep the pipes sliding relative to each other is low because the pipes are already in motion as the surfaces of the pipe contact each other. Therefore, the tangential force exerted when coupling the pipes together must only be sufficient to overcome the sliding coefficient of friction. However, after the pipes are coupled together, a much larger tangential force is required to disengage the pipes from each other because the static coefficient of friction is typically much greater than the sliding coefficient of friction. Because the tangential force required to disengage the pipes from each other is so large, it is often difficult to disengage a temporarily coupled pipe by hand.

BRIEF SUMMARY OF THE INVENTION

The present invention relates to a pipe separator for separating one pipe from another pipe at a pipe joint interface, the pipe joint being formed by a male portion fitted within a female portion. The pipe separator includes an elongate shaft for grasping by a user in order to hold the pipe separator adjacent to the pipe joint. Additionally, the shaft has a gripping portion which can be made out of a cushioning material. The pipe separator also has an engagement portion linked to the elongate shaft. The engagement portion has a bottom mounting surface and a side surface. The engagement portion is configured to be mounted on the male end of a pipe, adjacent to a pipe joint, such that the bottom mounting surface contacts the male end of the pipe, and such that the side surface of the engagement portion contacts the rim of the female portion of the pipe joint.

A further embodiment of the invention relates to a pipe separating kit that includes a shaft having a gripping portion, wherein the gripping portion is made of a cushioning material and multiple engagement portions that are selectively attachable to the shaft. The engagement portions of the pipe separating kit are configured to be mounted to the male end of a pipe, adjacent to a pipe joint, such that the side surface of the engagement portion contacts the rim of the female portion of the pipe joint.

The invention also includes a method of separating a pipe from a pipe joint, the method involving a pipe separator comprising: (i) a shaft having a gripping portion, wherein the gripping portion is made of a cushioning material, and (ii) an engagement portion that is configured to be mounted on the male end of a pipe, adjacent to a pipe joint, such that the side surface of the engagement portion contacts the rim of the female portion of the pipe joint. This method further includes steps of mounting the pipe separator to the male end of a pipe in a location directly adjacent to the rim of the female portion of a pipe joint, and applying a force sufficient to disengage the pipe from the joint. Thus, the pipe separator can be conveniently used to separate pipes without damage them.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to a pipe separator for separating one pipe from another pipe at a pipe joint interface where the joint being separated is formed by a male portion of one pipe fitted within a female portion of a second pipe. The pipe separator includes an elongate shaft which can be grasped by a user in order to hold the pipe separator adjacent to the pipe joint interface. The elongate shaft is also fitted with a gripping portion which can be made out of a cushioning material. The cushioning material for the gripping portion can be composed of any number of materials including, but not limited to, rubber, leather, or soft plastic.

The pipe separator also has an engagement portion linked to the elongate shaft. The engagement portion of the pipe separator has a bottom mounting surface and opposing side surfaces. The engagement portion is configured to be mounted on the male end of a pipe, adjacent to a pipe joint, such that the bottom mounting surface of the engagement portion contacts the male end of the pipe, and such that one side surface of the engagement portion contacts the rim of the female portion of the pipe joint. The engagement portion can be further selected from a group of engagement portions which vary in size according to the outer diameter of the male portion of the pipe that is to be separated. This configuration enables the user to interchangeably mount engagement portions of differing size to the elongate shaft according to the diameter of pipe that is to be separated.

Figure 1:
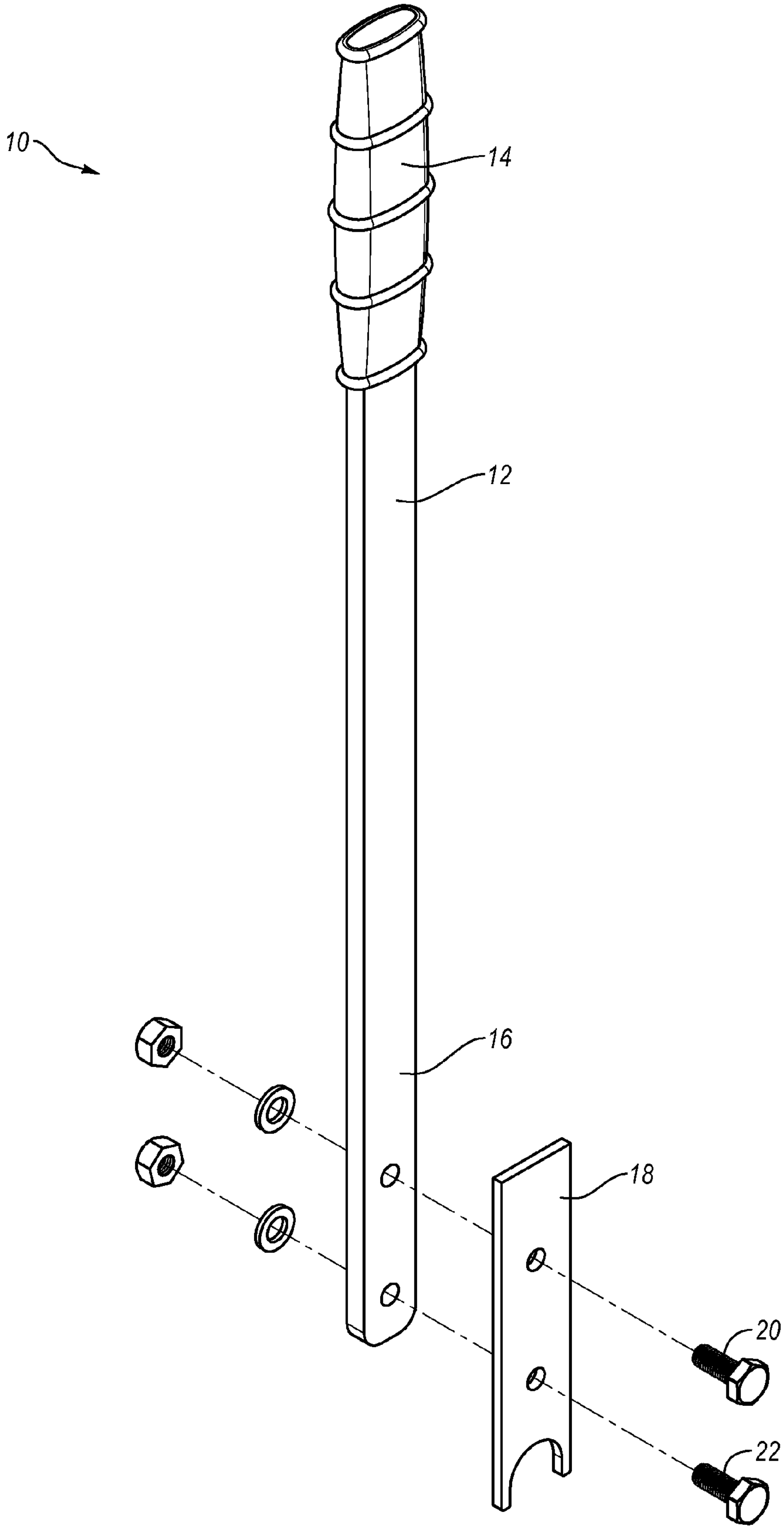
FIG. 1 is an exploded view of an exemplary pipe separator according to one embodiment of the present invention.

FIG. 1 is an exploded view of an exemplary pipe separator 10 according to one embodiment of the present invention. Pipe separator 10 comprises: a shaft 12, a gripping portion at the upper end 14, a receiving portion at the lower end 16, an engagement portion 18 that is selectively attachable to receiving portion 16, and couplers 20 and 22.

In an exemplary embodiment, the gripping portion at the upper end 14 of the elongate shaft 12 can be made of shock absorbing rubber material. This material is suitable for the gripping portion because it provides a non-slip surface when grasped by the hand of a user and dissipates any vibrations which may travel along the elongate shaft when a force is applied to side surface of the engagement portion during separation of the pipes.

Figure 2:
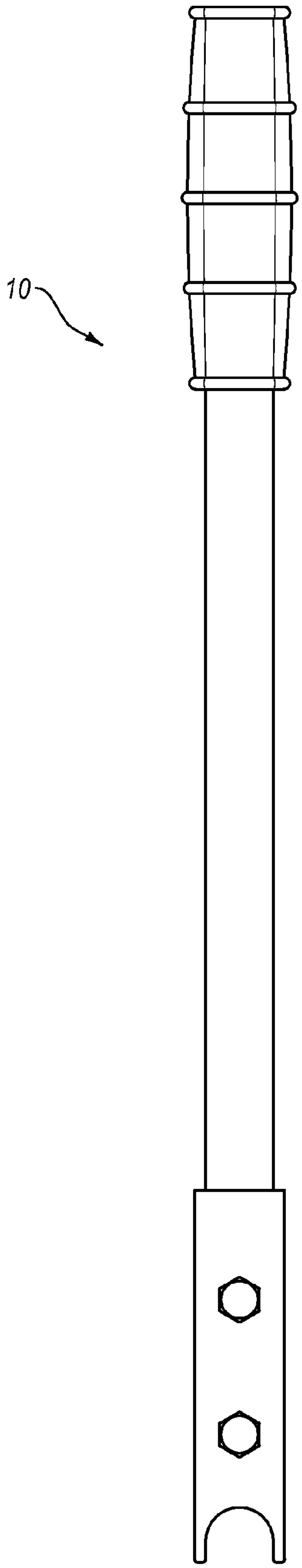
FIG. 2 is a front perspective view of the assembled exemplary pipe separator in FIG. 1.
Figure 3:
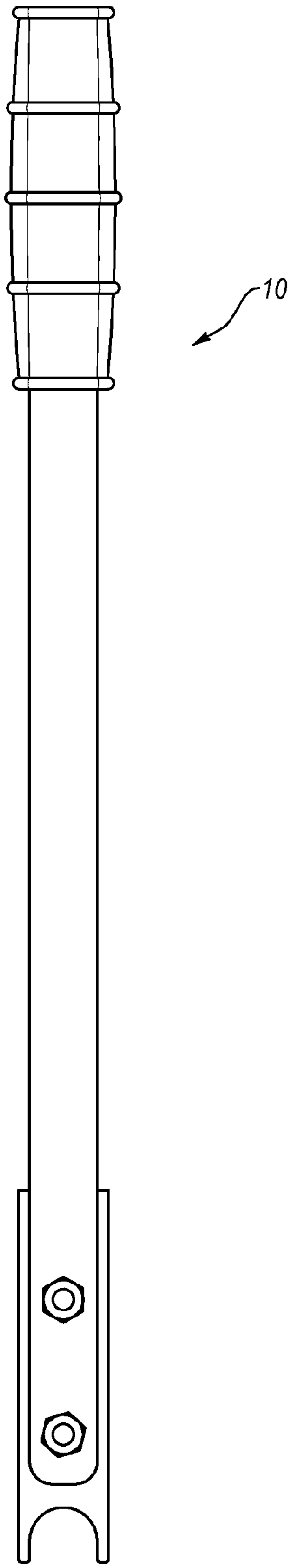
FIG. 3 is a rear perspective view of FIG. 2.

FIG. 2 is a front perspective view of the assembled exemplary pipe separator 10 in FIG. 1. Additionally, FIG. 2 shows assembly of the exploded pipe separator in FIG. 1 with the engagement portion attached to the elongated shaft at the receiving portion. FIG. 2 also provides a view of one of the side surfaces of the engagement portion of the pipe separator which is configured to contact the rim of the female portion of the pipe joint assembly. FIG. 3 is a rear perspective view of FIG. 2. Like FIG. 2, FIG. 3 also shows an assembled view of pipe separator 10.

Figure 4:
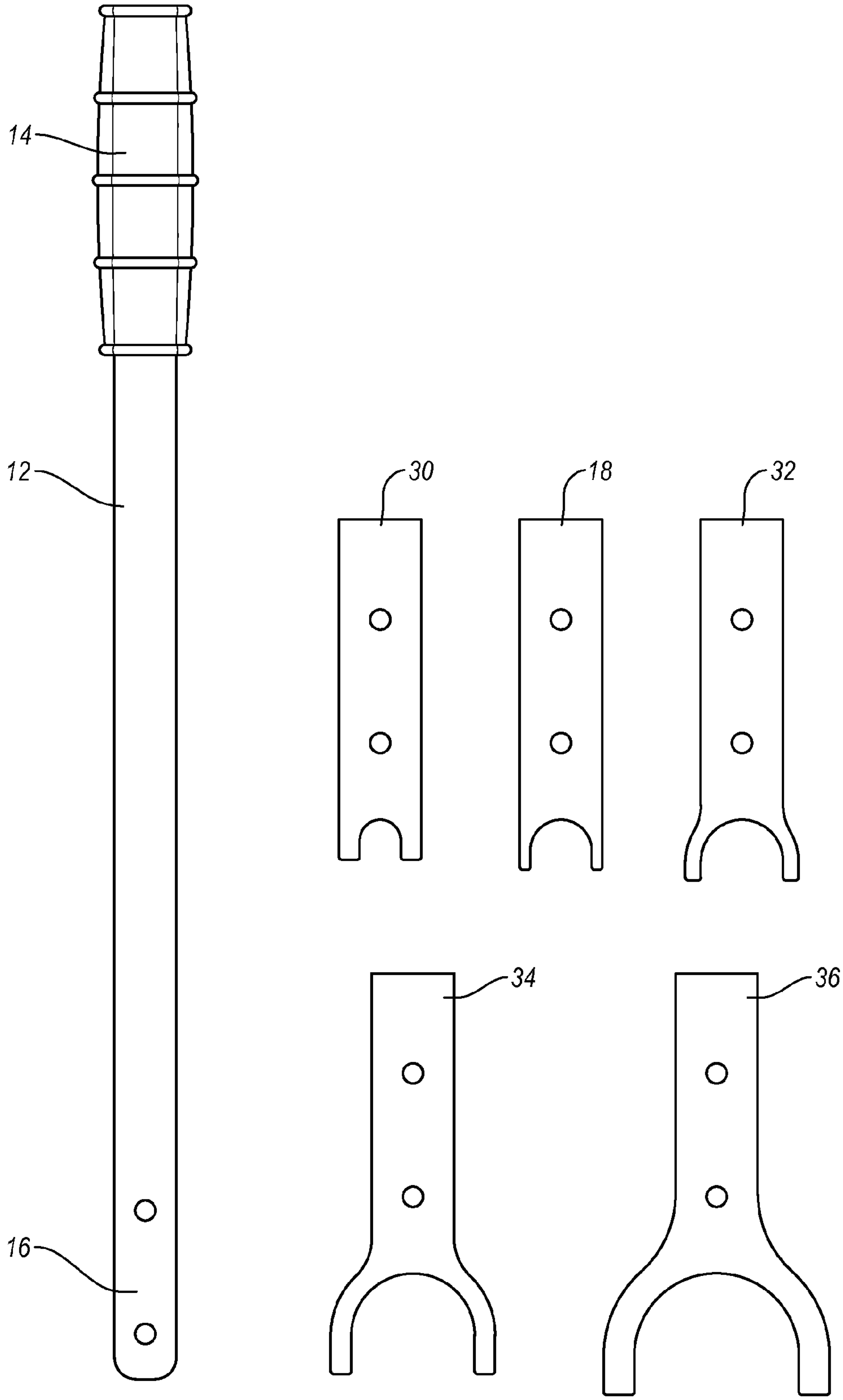
FIG. 4 is a view of a pipe separator of the present invention showing engagement portions that can be interchangeably attached to the shaft of the pipe separator to allow the pipe separator to feature engagement portions of differing sizes.

FIG. 4 is a view of a pipe separating kit of the present invention showing engagement portions 18, 30, 32, 34, and 36 that are selectively replaceable. The selectively replaceable engagement portions are further configured to be interchangeably attached to the shaft 12 of the pipe separator at the receiving portion 16 to allow the pipe separator to feature engagement portions of differing sizes. The engagement portions 18, 30, 32, 34, and 36 are manufactured with inner diameters of progressively increasing size to allow the pipe separator to be mounted to the male end of pipes of varying sizes. In this design, the inner diameter of the engagement portion is large enough to allow the male pipe that is to be separated to fit inside the engagement portion of the pipe separator, but not so large that the female portion of the pipe joint assembly would also fit within its inner diameter.

Thus, the inner diameter of each engagement portion is larger than the outer diameter of the male joint portion and smaller than the outer diameter of the female joint portion. Constraining the diameter of the selected engagement portion in this manner allows the pipe separator to fit over the male portion of the pipe joint assembly, while ensuring that a side surface of the engagement portion makes contact with the rim of the female portion of the pipe joint assembly when the pipe separator is engaged with the pipe joint assembly.

Figure 5:
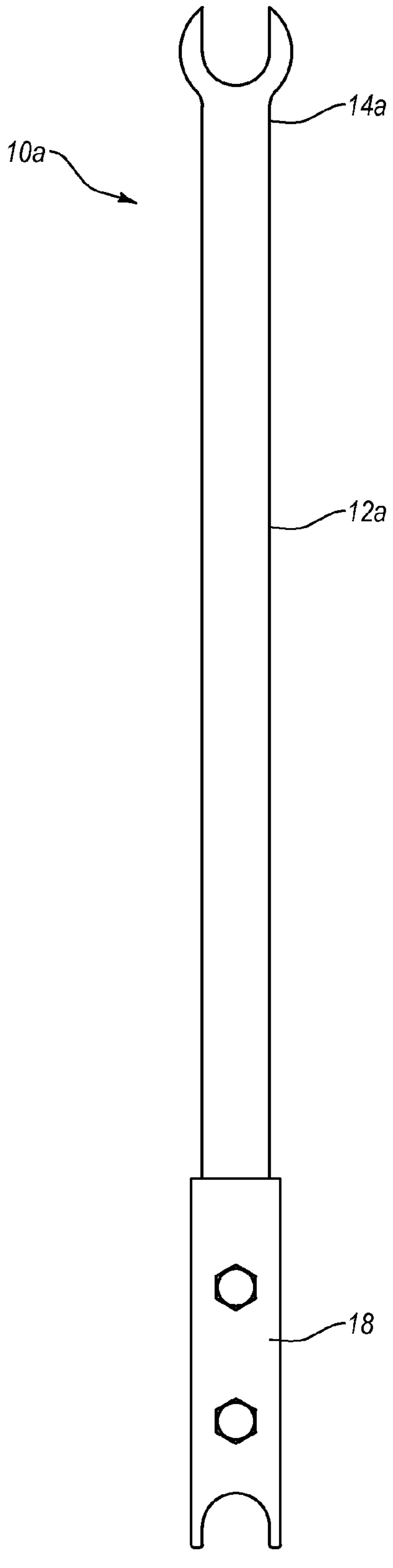
FIG. 5 is another embodiment of the present invention showing a gripping portion of the pipe separator in the form of a second engagement portion at the end opposite the interchangeable engagement portion.

In an exemplary embodiment, the engagement portions 18, 30, 32, 34, and 36 are manufactured such that the inner diameter of the engagement portions are sized to accept 0.25, 0.5, 0.75, 1.0, and 2.0 inch pipes made out of polyvinyl chloride. FIG. 5 is another embodiment of a pipe separator 10*a*, pipe separator 10*a* having an upper end 14*a* in the form of a second engagement portion, which is at the end opposite the interchangeable engagement portion 18. In this embodiment, the second engagement portion has a fixed inner diameter and is permanently affixed to the elongate shaft. The inner diameter of second engagement portion can be selected to be mounted on the outer diameter of the pipe used most prevalently by the user so that engagement portion does not need to be switched out each time the user desires to separate a pipe from a pipe joint interface.

Figure 5A:
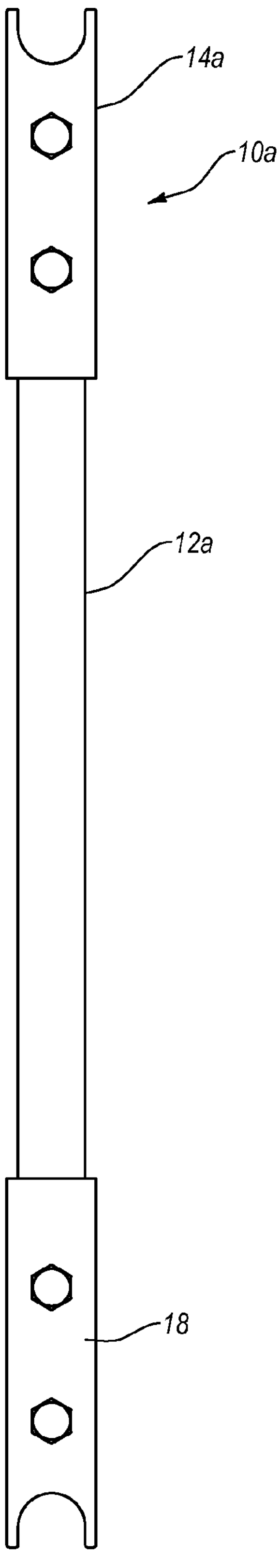
FIG. 5A is an additional embodiment of the present inventions showing a pipe separator with selectively interchangeable engagement portions at either end of the elongate shaft.

FIG. 5A is an alternative embodiment of the present inventions where the second engagement portion at the upper end 14*a* is selectively replaceable, similar to the selectively replaceable engagement portion of FIG. 4. This alternative configuration, with interchangeable engagement portions at both ends of the pipe separator 10*a*, allows a user to select two different engagement portions as needed by the user.

Figure 6A:
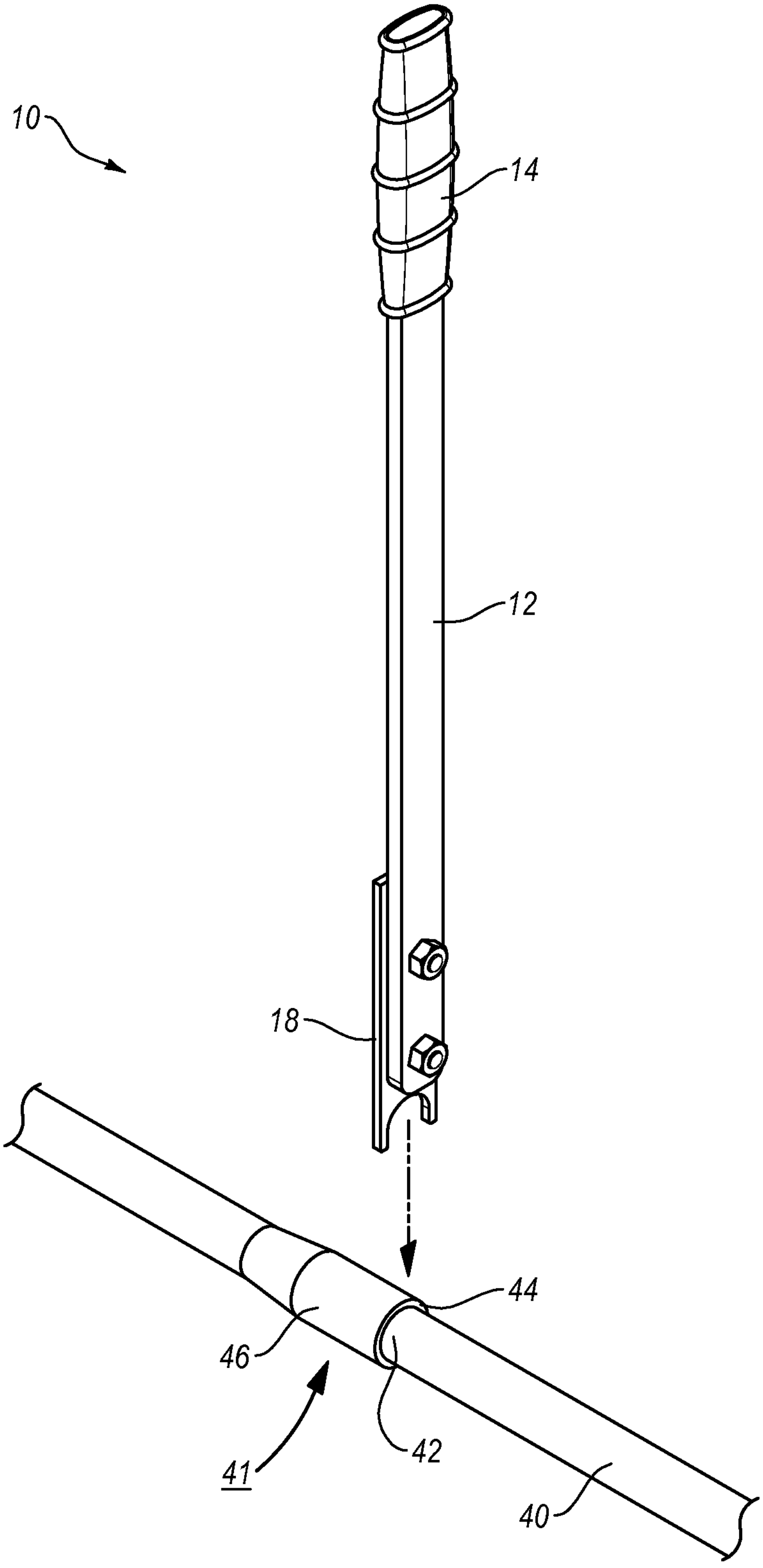
FIG. 6A is a functional representation of the pipe separator of FIG. 1 depicting the engagement portion thereof engaging the outer diameter of the male portion of the pipe joint in a location directly adjacent to the rim of the female portion of the pipe joint.

FIG. 6A is a functional representation of the pipe separator 10 of FIG. 1 depicting a pipe separator having an elongate shaft 12, the elongate shaft having an upper gripping portion 14, and an engagement portion 18. The pipe joint shown in FIG. 6A is an example of a pipe joint for use with separator 10, however, a pipe separator 10 can be used on a variety of different joints.

FIG. 6A further shows the engagement portion 18 of the pipe separator being mounted onto the outer diameter of the male portion 40 of the pipe joint 41 in a mounting location 42 directly adjacent to the rim 44 of the female portion 46 of the pipe joint. As mentioned previously, the inner diameter of the engagement portion 18 is selected to ensure that the male portion 40 of the pipe joint assembly 41 fits within the engagement portion, but is small enough so that a side surface of the engagement portion still contacts the rim 44 of the female portion 46 of the pipe joint 41.

Figure 6B:
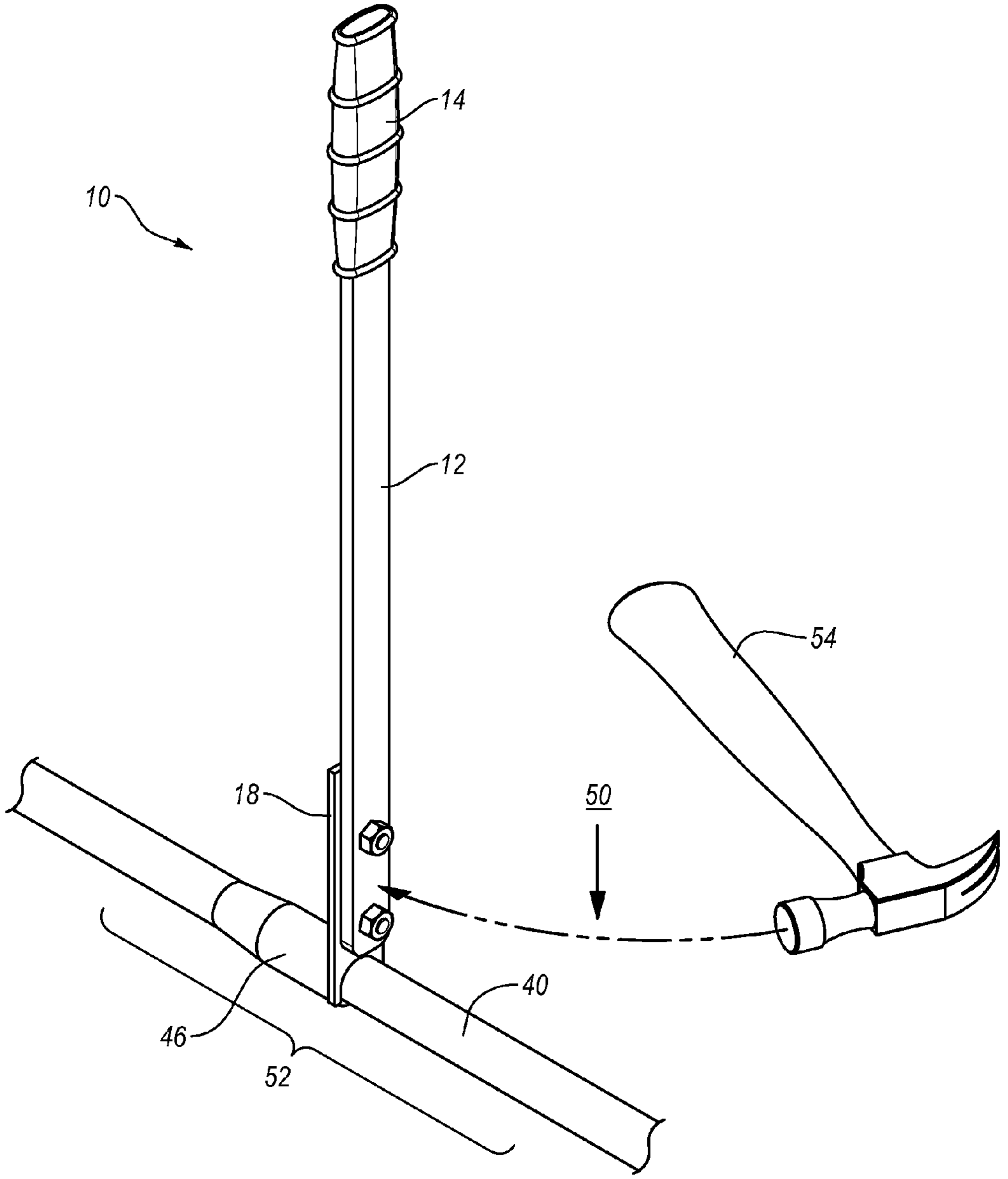
FIG. 6B depicts a force being applied to the side of the engaged pipe separator (depicted in FIG. 6A) in the direction of the longitudinal axis of the pipe.

FIG. 6B depicts a force 50 being applied to a side of the engaged pipe separator 10 in the direction of the longitudinal axis of the pipe assembly 52, the force being applied by striking the pipe separator with a hammer 54, for example. While the force in this embodiment is applied by striking the pipe separator 10 with a hammer 54, other embodiments are also envisioned where the force could be applied to the pipe separator 10 by a metal pipe, a wrench, or any another tool. Alternatively, a force could be applied by merely sliding the engaged pipe separator 10 laterally along the length of the pipe, towards the pipe joint, until the pipe separator 10 contacts the rim of the female portion 46 of the pipe joint assembly 52. The sliding force applied in this manner should be sufficient to disengage the pipes from the pipe joint assembly 52. Finally, rather than a striking force, other embodiments could include applying either a prying or a pushing force to the pipe separator in order to separate the pipes. Thus, in one embodiment, the force is applied by pressing the pipe separator against the joint. In another embodiment, the force is applied by prying the pipe separator against the joint. In yet another embodiment, applying the force further comprises (i) sliding the pipe separator laterally along the length of the pipe towards the pipe joint; and (ii) contacting the rim of the female portion of the pipe joint with a force sufficient to disengage the pipe from the pipe joint. These are various examples of applying the separating force to separate the joint wherein the force to separate the joint is applied by moving the pipe separator against the rim of the female portion of the pipe joint with sufficient force to separate the joint.

Figure 6C:
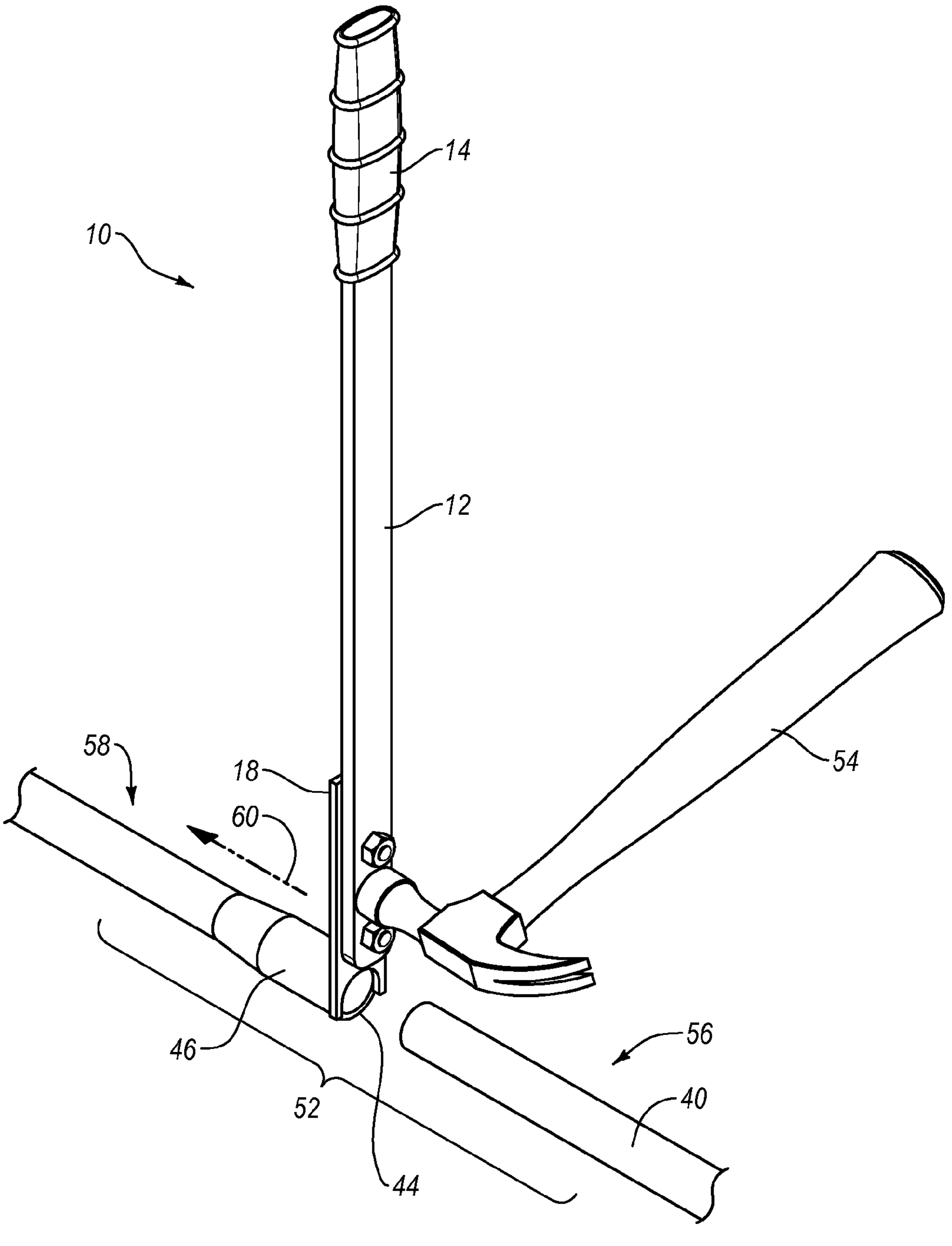
FIG. 6C is a depiction of two pieces of pipe being separated from each other as a force is applied to a side of the engaged pipe separator, further depicted in FIGS. 6A and 6B.

FIG. 6C is a depiction of two pieces of pipe 56 and 58 being separated from each other as a force 60 is applied, in the direction of the longitudinal axis of the pipe, to a side of the engaged pipe separator 10 (further depicted in FIGS. 6A and 6B). As the force 60 is applied to the pipe separator 10, the force 60 is transferred through the pipe separator to the rim 44 of the female portion 46 of the pipe assembly 52. As the force is transferred to the female portion 46 of the pipe joint assembly 52 the pipe separator 10 and the female portion 46 of the pipe continue in motion, away from the male portion 40 of the pipe joint assembly 52, while the male portion 40 remains in place. This motion causes the female portion 46 and the male portion 40 of the pipe joint assembly 52 to become separated. In an additional embodiment, the force 60 is applied directly to the engagement portion 18 rather than to the end of the shaft 12 opposite the gripping portion 14.

One embodiment of the present invention envisions the pipes to be separated being made of polyvinyl chloride (PVC), however, the pipes could be made from any material commonly used to manufacture pipes. The pipe assembly 52 to be separated can be selected from the group of pipes consisting of 0.25, 0.5, 0.75, 1, 1.5, 2, 2.5, 3, or 4 inch pipe, for example, although a variety of different sizes of pipe can be separated with pipe separator 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of separating a pipe from a pipe joint comprising:

providing a pipe separator, the pipe separator comprising:

a shaft having a gripping portion, wherein the gripping portion comprises a cushioning material;

an engagement portion that is configured to be mounted on the male end of a pipe, adjacent to a pipe joint, such that a bottom mounting surface of the engagement portion contacts the male end of the pipe, and such that a side surface of the engagement portion contacts a rim of a female portion of the pipe joint; and a striking surface positioned on the shaft adjacent to the engagement portion;

mounting the pipe separator to the male end of a pipe in a location directly adjacent to the rim of the female portion of a pipe joint such that at least a portion of the male end of the pipe fits inside the engagement portion; and applying a striking force to the shaft in a first direction toward the rim of a female portion of the pipe joint, wherein the striking force causes the shaft to move in the direction of the rim of the female portion of the pipe joint, the striking force being sufficient to disengage the pipe from the joint, such that the female portion moves in the same direction as the direction of the striking force.

2. A method as in claim 1, wherein the striking force is applied in the direction of the longitudinal axis of the pipe.

3. A method as in claim 1, wherein the striking force is applied by striking the striking surface of the pipe separator.

4. A method as in claim 3, wherein the striking force is applied by striking the striking surface of the pipe separator with a hammer.

5. A method as recited in claim 1, wherein the striking force is applied so as to move the pipe separator against the rim of the female portion of the pipe joint.

6. A method as recited in claim 1 wherein the striking force to separate the joint is applied by moving the pipe separator against the rim of the female portion of the pipe joint with sufficient force to separate the joint.

7. A method as in claim 1, wherein the pipes being separated by the pipe separator are comprised of polyvinyl chloride (PVC).

8. A method as in claim 1, further comprising selecting from among a group of selectively replaceable engagement portions.

9. A method as in claim 1, wherein the bottom mounting surface is concave.

* * * * *